(12) United States Patent
MacInnis

(10) Patent No.: US 9,819,749 B2
(45) Date of Patent: *Nov. 14, 2017

(54) SYSTEMS AND METHODS FOR THE DEMAND-DRIVEN DEPLOYMENT OF LOCATION-NEUTRAL SOFTWARE

(71) Applicant: Aetherworks LLC, New York, NY (US)

(72) Inventor: Robert Francis MacInnis, Westport, CT (US)

(73) Assignee: AETHERWORKS LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/705,113

(22) Filed: May 6, 2015

(65) Prior Publication Data

US 2015/0237149 A1    Aug. 20, 2015

Related U.S. Application Data

(63) Continuation of application No. 13/622,854, filed on Sep. 19, 2012, now Pat. No. 9,055,026, which is a
(Continued)

(51) Int. Cl.
*G06F 15/16* (2006.01)
*H04L 29/08* (2006.01)
*G06F 17/30* (2006.01)

(52) U.S. Cl.
CPC ........ *H04L 67/16* (2013.01); *G06F 17/30864* (2013.01); *H04L 67/10* (2013.01)

(58) Field of Classification Search
USPC .... 703/1; 709/202, 224, 226, 206, 217, 219, 709/223, 228, 232, 238, 203; 714/4;
(Continued)

(56) References Cited

U.S. PATENT DOCUMENTS 7,974,939 B2    7/2011  Nanjangud Bhaskar et al.
8,140,677 B2 *  3/2012  Chalasani .......... H04L 67/1095
                                                709/221
(Continued)

FOREIGN PATENT DOCUMENTS

JP      2006-318469 A    11/2006
JP      2010-511236 A     4/2010
WO   WO 2008/064981 A2    6/2008

OTHER PUBLICATIONS

Watson et al, "An Architecture for the Dynamic Deployment of Web Services on a Grid or the Internet," Technical Report Series CS-TR-890, Feb. 1, 2005, p. 1-13, [online], [retrieved on Jun. 23, 2016], Retrieved from the Internet: URL:http://www.cs.ncl.ac.uk/publications/trs/papers/890.pdf.

(Continued)

*Primary Examiner* — Quang N Nguyen
(74) *Attorney, Agent, or Firm* — Baker Botts L.L.P.

(57) ABSTRACT

Techniques for providing and consuming web services, including a service library configured to store one or more web services and a host directory connected to service hosts, configured to store data related to the service hosts. The service hosts are a network and adapted to receive and fulfill deployment requests for the web services stored in the service library by instantiating one or more endpoints of one of the web services. A manager is configured to query the host directory and the service library, generate a deployment plan, and transmit deployment requests to the one or more service hosts.

32 Claims, 15 Drawing Sheets

Related U.S. Application Data continuation of application No. PCT/US2012/056018, filed on Sep. 19, 2012.

(60) Provisional application No. 61/536,826, filed on Sep. 20, 2011.

(58) Field of Classification Search
USPC .................................................. 717/114, 140
See application file for complete search history.

(56) References Cited

U.S. PATENT DOCUMENTS

| | | | | |
|---|---|---|---|---|
| 8,489,741 | B2* | 7/2013 | Chalasani | G06F 11/0709 709/226 |
| 9,055,026 | B2 | 6/2015 | Macinnis | |
| 2004/0064548 | A1 | 4/2004 | Adams et al. | |
| 2004/0103195 | A1 | 5/2004 | Chalasani et al. | |
| 2004/0103339 | A1 | 5/2004 | Chalasani et al. | |
| 2004/0133640 | A1 | 7/2004 | Yeager et al. | |
| 2006/0111880 | A1* | 5/2006 | Brown | G06F 8/20 703/1 |
| 2006/0212855 | A1* | 9/2006 | Bournas | G05B 19/41865 717/140 |
| 2006/0271699 | A1 | 11/2006 | Lee et al. | |
| 2007/0083588 | A1* | 4/2007 | Keller | G06F 9/5038 709/202 |
| 2009/0300057 | A1 | 12/2009 | Friedman | |
| 2010/0269098 | A1* | 10/2010 | Debruin | G06F 8/51 717/114 |

OTHER PUBLICATIONS

U.S. Appl. No. 13/622,854, dated May 6, 2015, Issue Fee Payment.
U.S. Appl. No. 13/622,854, dated Apr. 15, 2015, Notice of Allowance.
U.S. Appl. No. 13/622,854, dated Mar. 23, 2015, Response to Non-Final Office Action.
U.S. Appl. No. 13/622,854, dated Sep. 23, 2014, Non-Final Office Action.
International Search Report and Written Opinion for PCT/US2012/056018, dated Nov. 21, 2012 (Corresponding U.S. Appl. No. 13/622,854).

* cited by examiner

SYSTEMS AND METHODS FOR THE DEMAND-DRIVEN DEPLOYMENT OF LOCATION-NEUTRAL SOFTWARE

CROSS-REFERENCE TO RELATED APPLICATIONS

This application is a continuation of U.S. patent application Ser. No. 13/622,854 filed Sep. 19, 2012, which on Jun. 9, 2015 issued as U.S. Pat. No. 9,055,026, and which is a continuation of International Patent Application Serial No. PCT/US2012/056018, filed Sep. 19, 2012 and claims priority to U.S. Provisional Application Ser. No. 61/536,826, filed on Sep. 20, 2011, the contents of both of which are hereby incorporated by reference in their entireties herein

BACKGROUND

The disclosed subject matter relates to techniques for service-oriented computing, and more particularly, but not by way of limitation, to web service architecture.

Service-oriented computing (SOC) promotes the assembly of application components into networks of services that can be loosely coupled to create flexible, dynamic business processes and agile applications that span organizations and computing platforms. Service-oriented computing has emerged as an approach to evolving tightly-coupled, component-based distributed systems into wider networks of services which can use uniform techniques to address, bind to and invoke service operations.

Service-oriented computing can provide a way to create new architectures that reflect trends toward autonomy and heterogeneity. Distributed architectures which enable the flexible and loosely-coupled processes of service-oriented computing can be referred to as service-oriented architectures (SOAs), of which software services are a primary component. The guiding characteristics of SOAs are the interoperation between loosely coupled autonomous services, the promotion of code reuse at a macro (service) level, and architectural composability.

SOAs can be composed of three primary entities—a provider, a consumer, and a registry. Providers can publish service locations in a registry; consumers can use the registry to locate services to program against and invoke. SOA implementations can specify the language used to describe services, provide the means to publish and discover them, and dictate the protocols and communication mechanisms used to interact with them. The deployment of software services on the Internet is increasingly achieved using one such set of standards collectively known as "web services."

Web services can be based on platform-independent standards, for example those developed through the efforts of the W3C working group. These standards can define the protocols, message formats, and service description language which enable interaction between clients and services on heterogeneous computing platforms across the Internet.

The standards introduced by web services can provide the means to evolve distributed systems from tightly-coupled distributed applications into loosely-coupled systems of services. The standards can enable interoperation between heterogeneous computing platforms through the exchange of messages using well-defined interfaces. By abstracting over implementation and hosting technology, the platform-independent web service standards can provide a means of homogenizing access to existing heterogeneous services while promoting the development of new services without forcing the adoption of anyone particular implementation or hosting technology. While the web services model has been widely adopted, its promise can be undermined by at least two limitations.

First, the web service addressing model can be rigid and only suited to highly reliable networked environments with highly reliable hosts. It can fail to take into account the intrinsic dynamism and fallibility of hosts on the Internet, and applications which aim to be robust to the failure of hosts can become littered with failure-recovery code. Second, an over-burdened and under-specified Service Provider role can lead to the development of proprietary deployment systems and closed-world environments where the use of web services is only incidental. Saddled with these two drawbacks, the wide adoption of the web services model can result in a landscape of software services that is highly populated by applications which expose web service interfaces, but which are largely incompatible in terms of their required deployment systems and hosting environments.

Accordingly, there is a need for an improved web services architecture.

SUMMARY

In one aspect of the disclosed subject matter, a system for providing web services includes a Service Library configured to store one or more web services. One or more Service Hosts, connected to a network, are adapted to receive and fulfill deployment and undeployment requests for the web services stored in the Service Library. Fulfilling deployment and undeployment requests can include instantiating one or more endpoints of the web services. A Host Directory, connected to the Service Hosts, is configured to store data related to the Service Hosts. A Manager is configured to query the Host Directory and the Service Library, generate a deployment plan, and transmit deployment and undeployment requests to the Service Hosts.

In one embodiment, the Service Library can be configured to receive the web services from a Publisher. The Service Hosts can transmit information about usage of the web services to the Manager. The Service Hosts can send the data related to the one or more Service Hosts, for example available resources, to the Host Directory.

In one embodiment, the system can include a discovery service including a directory, which can be configured to register and maintain entries of the endpoints corresponding to each Service Host. The directory service can store a mapping between the web services and a corresponding set of endpoints on which the web services are deployed. The directory service can be configured to receive a uniform resource identifier (URI) request corresponding to one of the web services, and request and resolve a URL corresponding to one of the endpoints on which the web service is deployed.

In another aspect of the disclosed subject matter, a method for providing web services includes storing one or more web services in a Service Library and storing data related to one or more Service Hosts in a Host Directory. The method includes controlling, with a Manager, deployment and undeployment of the one or more web services on one or more service endpoints on each of the one or more Service Hosts. Controlling can include querying the Service Library and Host Directory to retrieve information and data about the web services and the Service Hosts, generating a deployment plan using the information and data, transmitting deployment and undeployment requests to the Service Hosts, and instantiating one or more endpoints of the web services in response to the deployment and undeployment requests.

In another aspect of the disclosed subject matter, a method for consuming web services includes binding a consumer agent to a point of presence. The point of presence can communicate with a discovery service to resolve a URL corresponding to a service endpoint that corresponds to a desired web service URI. The point of presence can bind to the service endpoint. The discovery service communicates with a Manager, which is configured to query a Host Directory and Service Library, generate a deployment plan, and transmit deployment and undeployment requests to one or more Service Hosts.

Figure 1:
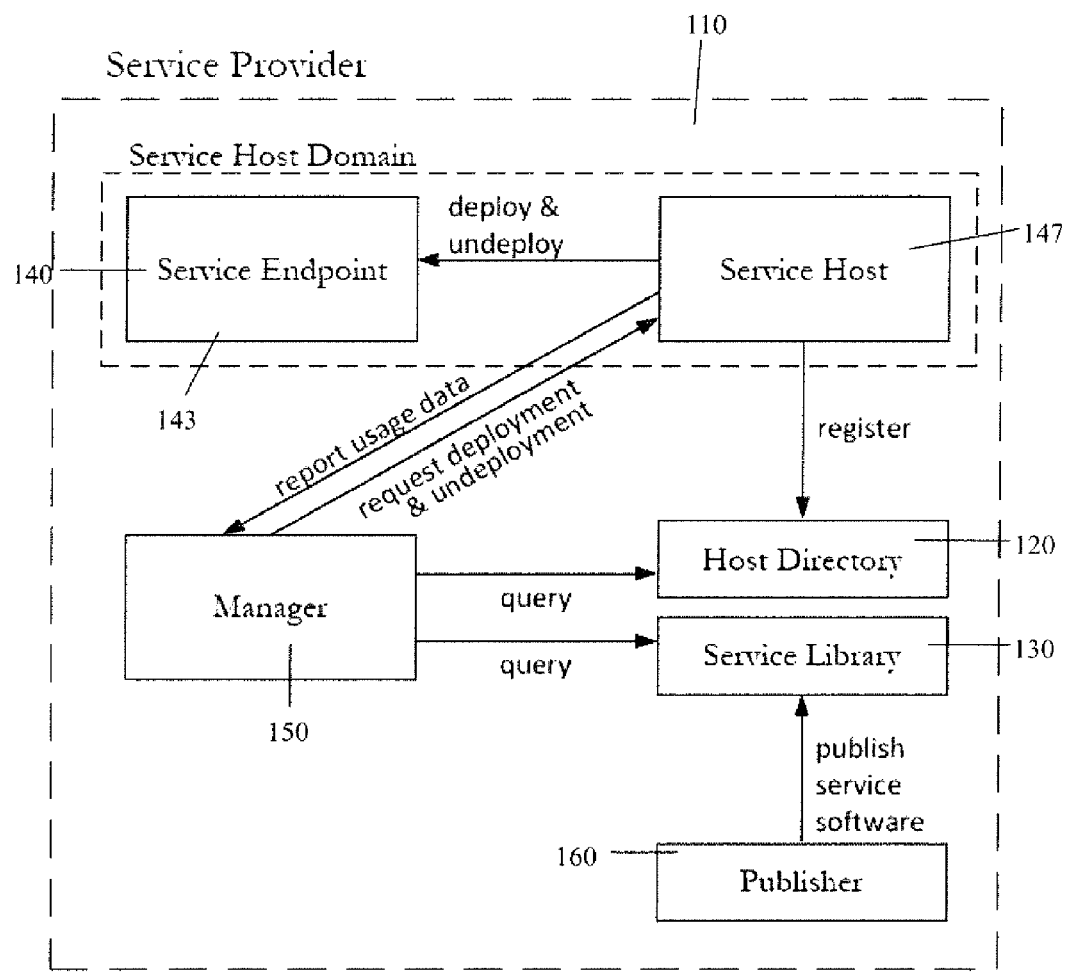
FIG. 1 is a schematic diagram of the service provider portion of an embodiment of a system for providing web services in accordance with the disclosed subject matter.

Throughout the drawings, the same reference numerals and characters, unless otherwise stated or indicated by context, are used to denote like features, elements, components or portions of the illustrated embodiments. Moreover, while the disclosed subject matter will now be described in detail with reference to the Figures, it is done so in connection with the illustrative embodiments, which are intended to be non-limiting.

DETAILED DESCRIPTION

As used herein, the term "actor" can refer to an entity responsible for taking an action. For example, an actor can include an automated computer program. Alternatively, an "actor" can refer to a computer program with a user interface suitable to be controlled by an operator of the computer.

As used herein, the term "infrastructure" can refer, collectively, to the described architectural components existing in an operational state, independent of any particular implementation.

As used herein, the term "web service" can refer to the deployment of software services over a network. As used herein, the term "web service" is not intended to be limited to the deployment of software services over the internet, as one of ordinary skill in the art will appreciate that such services can also be deployed on other networks, such as a local area network LAN or the like.

For purposes of illustration, and not limitation, description will now be made of certain standards for describing (Web Service Definition Language (WSDL)), advertising and discovering (Universal Description Discovery and Integration (UDDI)), and communicating (Simple Object Access Protocol (SOAP)) with web services in connection with the disclosed subject matter. However, one of ordinary skill in the art will appreciate that other suitable standards, such as Representational State Transfer (REST), can be used, and the following description is not intended to be limiting.

Web services can interact through the exchange of messages using SOAP. SOAP defines a communication protocol for web services which is independent of programming languages and platforms and can be used over a broad range of transport protocols. For example, SOAP over HTTP can be used as the reference protocol binding definition for web services.

SOAP messages can include an outer XML element, which can be referred to as an "envelope," which defines the namespace(s) for the message, an optional header element which includes any relevant extensions to the messaging framework, and a required body element. The body element can provide a mechanism for transmitting information to an ultimate SOAP receiver but unspecified beyond this role, with neither a defined structure or interpretation, nor a means to specify any processing to be done.

WSDL is a language for describing web services in XML. The Component Interface Description of a service can be realized as a WSDL document, which can includes information required to locate, bind to, and interact with a web service endpoint. WSDL documents are constructed from XML document elements that describe web service endpoints in terms of their operations, the parameters and return values of each operation (including type definitions), and the protocol and data bindings used for communication.

Requester agent software can be written against an endpoint's WSDL document, for example with automatic code-generation tools to generate proxy or "stub" code in a particular language. These can be stand-alone tools, such as "WSDL to Java" for Java, as well as IDE-based, such as in Visual Studio and Eclipse, which provide a pluggable framework for generators producing code in Perl, C++, C#, PHP, and others.

Exemplary embodiments of the disclosed subject matter are described below, with reference to FIG. 1, FIG. 2, FIG. 3, and FIG. 4, for purposes of illustration, and not limitation.

In an exemplary embodiment, and with reference to FIG. 1, a system for providing web services can include a service provider component 110. The service provider component 110 can be embodied in, for example, a computer program. The computer program can be stored on a computer readable medium, such as a CD-ROM, DVD, Magnetic disk, ROM, RAM, or the like. The instructions of the program can be read into a memory of one or more processors included in one or more computing devices, such as for example a server connected to a network or a distributed computer system. When executed, the program can instruct the processor to control various components of the computing device. While execution of sequences of instructions in the program causes the processor to perform certain functions described herein, hard-wired circuitry may be used in place of, or in combination with, software instructions for implementation of the presently disclosed subject matter. Thus, embodiments of the present invention are not limited to any specific combination of hardware and software.

In connection with an exemplary embodiment, the service provider component 101 can include, for example, a Service Library 130 can be configured to store one or more web services. For example, the Service Library 130 can be connected to a Publisher 160, which can "publish" a web service to the Service Library 130 for storage. Service host 147, connected to a network, can be adapted to receive and fulfill deployment and undeployment requests for the web services stored in the Service Library 130. For example, fulfilling deployment and undeployment requests can include instantiating one or more endpoints 143 of one of the web services. A Host Directory 120 can be connected to the Service Host 147 and configured to store data related to the one or more Service Hosts 147. A Manager 150 can be configured to query the Host Directory 120 and the Service Library 130, generate a deployment plan, and transmit deployment and undeployment requests to the Service Host 147.

The Service Host 147 can be configured to transmit information about usage of the web services to the Manager 150. The Service Hosts 147 can also be configured to send data related to their available resources to the Host Directory 120.

This exemplary embodiment can reduce complexity for participants in the web service lifecycle by partitioning the responsibility of providing a web service into multiple independent roles, reducing the amount of domain-specific knowledge required by each actor and lowering the barriers to participation in the provision of web services. For example the tasks of publishing, deploying and hosting a web service can be treated as distinct, independent activities. Thus, for purposes of illustration and not limitation, the service provider component 101 can be viewed as three distinct "actors": Publisher 160, Manager 150, and Service Host 147. Additionally, two architectural entities: repositories called the Service Library 130 and Host Directory 120.

Rather than being deployed explicitly, a web service provider agent implementation can instead be described by a Publisher 160 who then "publishes" it into the infrastructure by storing it in a repository called the Service Library 130. This approach represents an approach to web service deployment by separating service substantiation from actual realization—i.e., the lifecycle of a web service can begin when it is published, not when it is deployed.

In order to participate in the infrastructure, Service Hosts 147 can register their willingness to host web services by describing their available resources and registering with a directory called the Host Directory 120. Service Hosts 147 can indicate their available web service deployment containers and specify the list of Publishers 160 whose web service provider agent implementations they are willing to deploy. Service Hosts 147 thus can participate in an infrastructure not by advertising their statically deployed services, but by advertising their hosting capabilities, joining a shared pool of latent hosting resources which can be dynamically consumed (and reclaimed) by Managers 150 as necessary to meet changing levels of demand.

Managers 160 can be responsible for managing the provisioning level of a single web service (for which there may be zero or more endpoints 140 at any given time). In order to enact deployment, Managers 160 can first query the Service Library 130 and Host Directory 120, then create deployment plans by pairing web service implementations with a suitably capable Service Host 147. Managers 150 can send deployment requests (433) to Service Hosts 147 who then can be responsible for instantiating an endpoint 140 of the web service (or denying the request). Service Hosts 147 can provide information about the usage of each web service endpoint deployed within their domain to each web service's Manager 150. A Manager 150 can use this usage data to make decisions about the necessary level of provisioning of the web service they manage.

Figure 2:
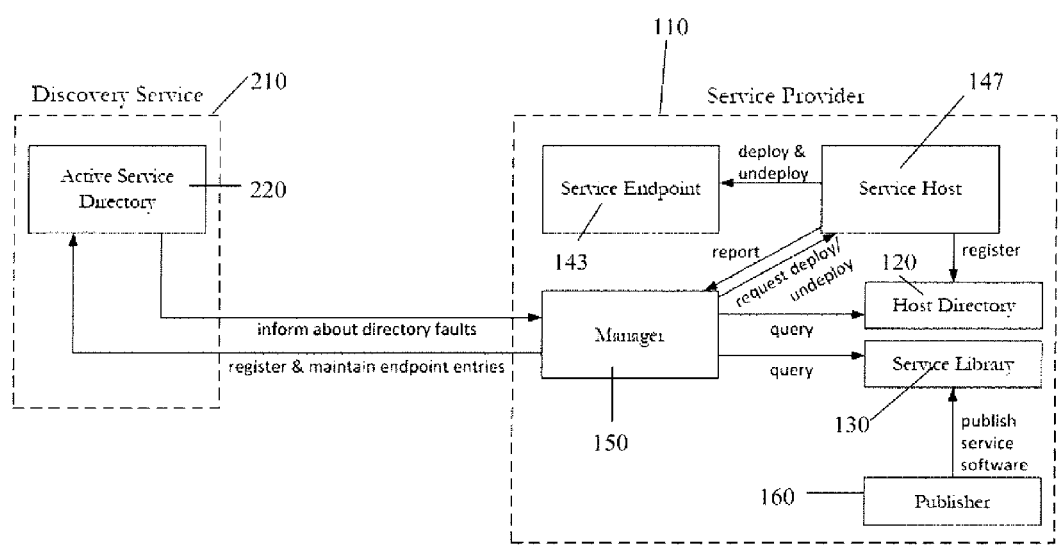
FIG. 2 is a schematic diagram of the discovery service and service provider portions of an embodiment of a system for providing web services in accordance with the disclosed subject matter.

In another exemplary embodiment, and with reference to FIG. 2, a system for providing web services can include a discovery service component 210. The discovery service component 210 can be embodied in, for example and in like manner to the service provider component 110, a computer program executed on a computing device. This computer device can be a physically separate device than that of the service provider component 110 coupled to the service provider component 110 via a network such as the internet. Alternatively, the computer device hosting the discovery service component 210 can be the same computer device hosting the service provider component 110. Notably, these computing devices and all others described herein may be implemented within the spirit and scope of the invention as single devices, clusters of devices, networks, or the like.

The discovery service component 210 can include an Active Service Directory 220. The Active Service Directory 220 can be configured, for example, to store a mapping between the web services stored in the Service Library 130 and a corresponding set of endpoints 143 on which the web services are deployed.

The Active Service Directory 220 can holds mappings between a single web service and a set of active endpoints 143 of the web service. A central entity in the architecture, the collective mappings held in the Active Service Directory 220 can represent the current state of an infrastructure from all participants" perspectives. Because all infrastructure participants can rely on the Active Service Directory 220 to locate endpoints 143 of their desired web services, this directory can instigate auto deployment procedures for web services that have no currently deployed endpoints.

The Active Service Directory 220 can provide operations to add, remove and locate (450) active endpoints 143 of web services. If the Active Service Directory 220 receives a lookup request for the active endpoints of a particular web service, but no such entries exist, the Active Service Directory 220 can proactively locate and inform the Manager 150 of the requested web service. The Manager can dynamically initiate the deployment of a new endpoint 143 using the previously described deployment procedure. Managers 150 can be responsible for inserting and maintaining all Active Service Directory 220 entries for any newly deployed endpoints 143 of the web service it manages. If, for example, demand for its web service drops to zero, a Manager 150 can decide to undeploy one (or all) of the deployed endpoints 143. If an endpoint 143 is undeployed the Manager 150 can remove the endpoint entry from the Active Service Directory 220, ensuring that the directory remains up-to-date and as accurate a reflection as possible of the current state of the infrastructure.

Figure 3:
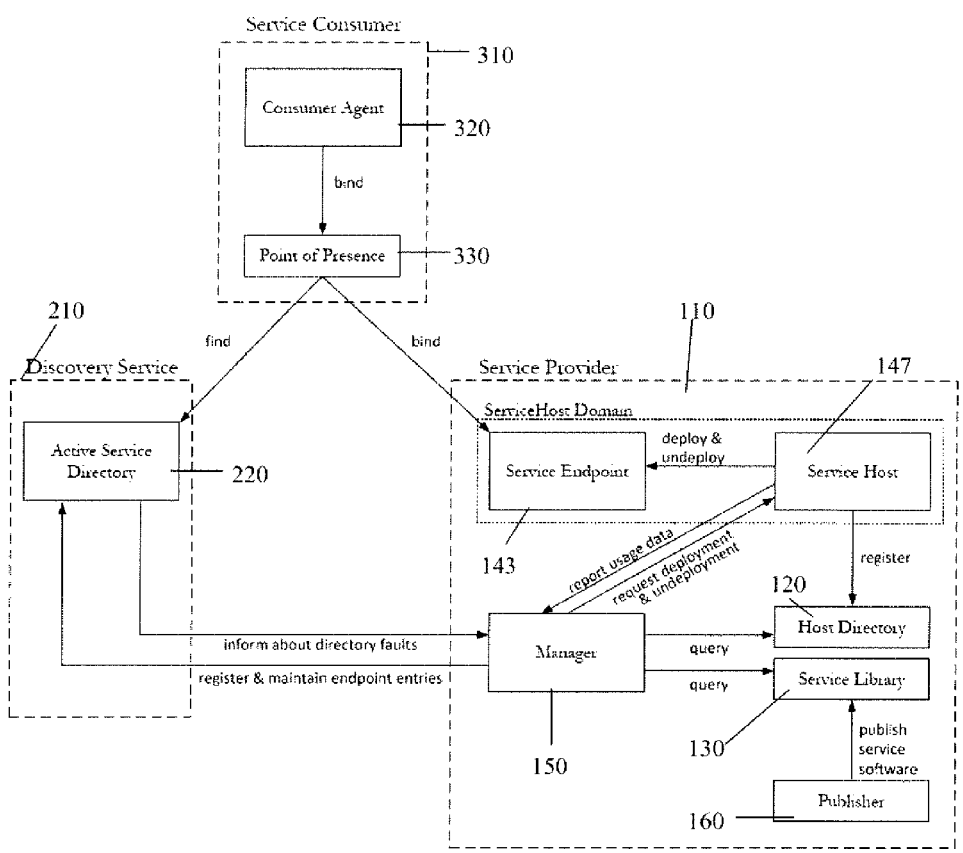
FIG. 3 is a schematic diagram of the service consumer, discovery service, and service providers of an embodiment of a system for providing and consuming web services in accordance with the disclosed subject matter.

In another exemplary embodiment, and with reference to FIG. 3, a system for providing web services can include a service consumer component 310. The service consumer component 310 can be embodied in, for example and in like manner to the service provider component 110, a computer program executed on a computing device. This computer device can be a physically separate device from that of the service provider component 110 coupled to the service provider component 110 via a network such as the internet. Alternatively, the computer device hosting the service consumer component 310 can be part of the same computer device hosting the service provider component 110.

The service consumer component 310 can include a consumer agent 320 and point of presence 330. The discovery service 210 can be configured, for example, to receive a URI corresponding to one or more of the web services in the Service Library 130 from the services consumer component 310 and request and resolve a one or more URLs corresponding to endpoints 143, if any, of the deployed web service. In connection with certain embodiments, multiple implementations of a particular web service can be published to the Service Library 130, each of which corresponds to the same URI. For example, a particular web service can be implemented using a number of different languages and/or requiring one or more different deployment environments. Each implementation can be stored in the service library 130 and can correspond to the same URI, and can implement the same interface such that a call to the any one of the particular implementations may yield the same return. The consumer agent 320 can be bound to the point of presence 330. The point of presence 330 can communicate with the discovery service and can bind to a service endpoint 143 using the URL. The point of presence 330 can be configured to abstract over a location of the service while preserving the consumer agent's 320 view, thereby acting as a gateway for the consumer agent into an instantiation of the web service.

In connection with this exemplary embodiment, the disclosed techniques do not require use of URLs to describe web services, as URLs may become invalid over time. Web services can instead be identified with a URI, abstractly describing a service which at any point in time can have zero or more active endpoints. The Service Consumer component 310 can be relieved from the tasks of locating and binding to web service endpoints 143 through the introduction of a mechanism which performs these tasks on their behalf.

This technique can present a limited-mediation framework for the consumption of web services which can transparently resolve a live endpoint URL from the URI contained in an invocation request. This framework can be realized as proxy mechanism, residing at the Service Consumer component 310, which can act as a gateway into an instantiation of the architecture—a "point of presence," as described above and depicted in FIG. 3. Consumer agent 320 software can be written to bind to this local point of presence 330 and invoke web service operations using the desired web service's URI. The point of presence 330 can be responsible for transparently resolving a URL from the URI by retrieving a list of active endpoints 143 of the web service from the Active Service Directory 220, selecting an endpoint for use, invoking the requested operation on behalf of the Service Consumer 310, and returning any results. It can also be responsible for transparently detecting and recovering from the failure of web services and the Service Hosts 147 on which they are deployed, and for proactively recovering from these failures by retrying alternative endpoints 143 (according to local policy). Unrecoverable errors can be returned to Service Consumers 310, indicating that given the available resources of the infrastructure, it is not currently possible to fulfill the request.

The point of presence 330 can abstract over the location of a service while still preserving the current Service Consumer component's 310 view upon the system. It can simplify the creation of consumer agent 320 applications, for example, by allowing developers to program against what a web service does, not where it is or whether it is currently deployed. Further, because it consumes all tasks which require interaction with the Discovery Service 210, the point of presence 330 can provide a layer of abstraction over the particular standards versions used in an infrastructure (e.g., UDDI version). This can provide a barrier to obsolescence in the face of evolving standards while enabling consumer agent applications to be portable between environments which use different standards.

Figure 4:
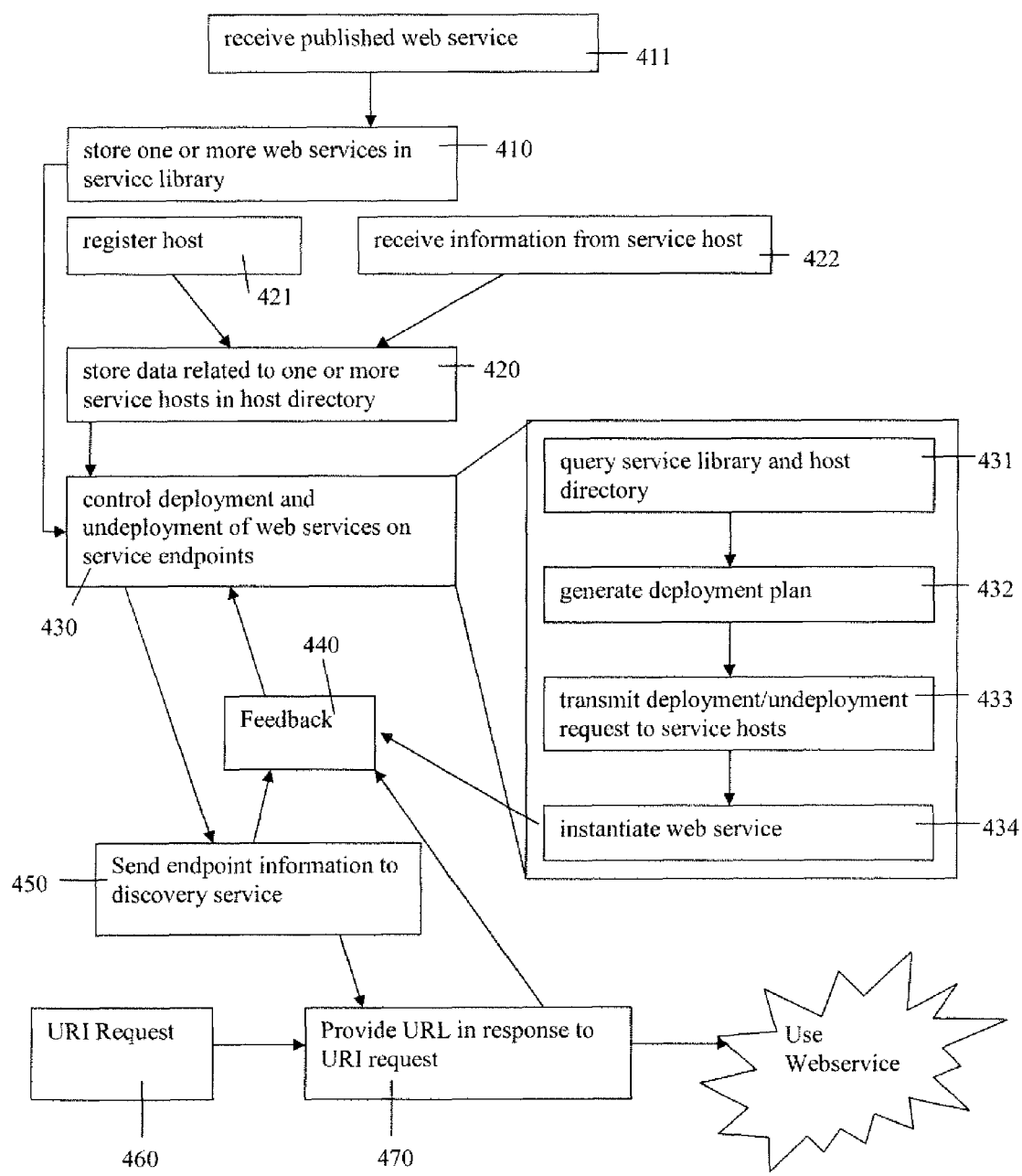
FIG. 4 is a flow chart demonstrating an embodiment of a method for providing and consuming web services in accordance with the disclosed subject matter.

In an exemplary embodiment, and with reference to FIG. 4, a method for providing web services can include storing (410) one or more web services in the Service Library. For example, the Service Library can receive (411) published web services from a Publisher. Data related to one or more Service Hosts can be stored (420) in a Host Directory. For example, the Host Directory can receive (422) data related to the Service Hosts, for example data about available resources and which Publishers a Service Host is willing to host a web service from. A Manager can control (430) deployment and undeployment of the web services on service endpoints on each of the Service Hosts. For example, the Manager can query (431) the Service Library and Host Directory to retrieve information about the web services and the data related to the Service Hosts. The Manager can then generate (432) a deployment plan using the information about the web services and the data related to the Service Hosts. The Manager can then transmit (433) deployment and undeployment requests to the Service Hosts. The Service Hosts can then instantiate (434) the web services in response to the deployment requests, or uninstantiate the web services in response to an undeployment request. Usage data and other information can be fed back 440 to the Manager from the Service Hosts.

The Manager can send (450) information about the endpoints on which web services are deployed to the Discovery Service, including the Active Service Directory. A Service Consumer can send a URI request (460) to the Directory Service, for example, through a local point of presence. The Discovery Service, in connection with the Manager, can provide a URL response (470) in response to the URI request, and the Service Consumer can bind to the endpoint which hosts a desired web service.

Description will now be made of exemplary interactions between certain components of the system disclosed herein, with reference to FIG. 5 to FIG. 10, for purposes of illustration, and not limitation.

Figure 5:
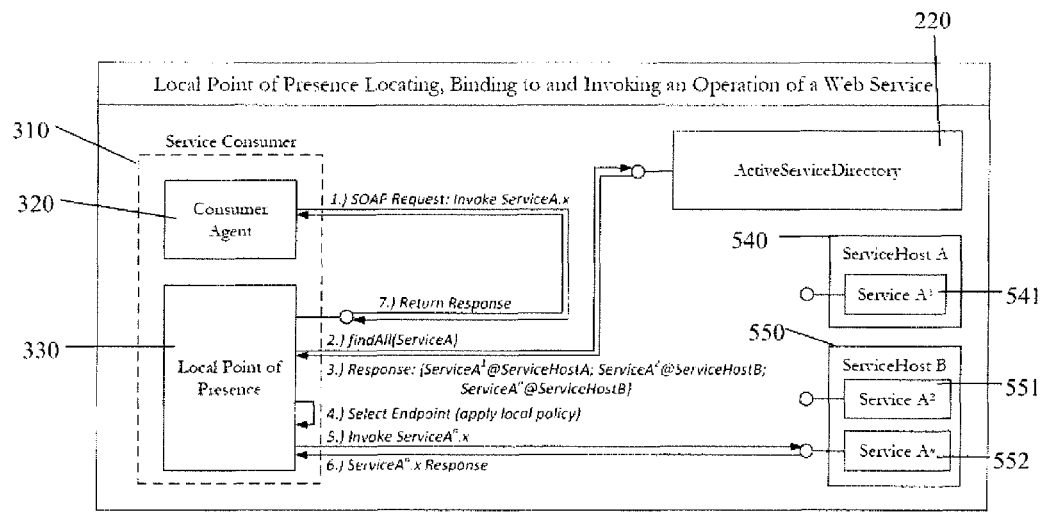
FIG. 5 is a schematic diagram of exemplary interactions between a service consumer and a local point of presence in accordance with an embodiment of the disclosed subject matter.

In accordance with an embodiment of the disclosed subject matter, and with reference to FIG. 5, service consumers 310 need not interact directly with web services endpoints. For example, a service consumer 310 can bind to and invoke operations upon a local point of presence 330. The POPs can be co-located with the service consumer 310; consumer agent 320 can be written to statically bind to the URI of a web service, for example prefixed with the protocol, hostname and port of a local URI.

For example, invoking operation "x" of a web service identified by the URI "ServiceA" is illustrated in FIG. 5. The consumer agent application can bind to and invoke the operation on the POP, which then can locate an endpoint of the requested web service. The POP can send a lookup request to the Active Service Directory 220 by invoking a "findAll" operation with the URI "ServiceA" as a parameter and can receive back a list of ServiceInstanceDescriptors describing the currently active endpoints 540 and 550 of ServiceA (541, 551, and 552). The POP can apply local policy to select which endpoint to use before connecting to the endpoint and invoking operation "x" on behalf of the Service Consumer. The results of the operation can be returned to the POP and finally returned to the consumer agent 320 application.

Figure 6:
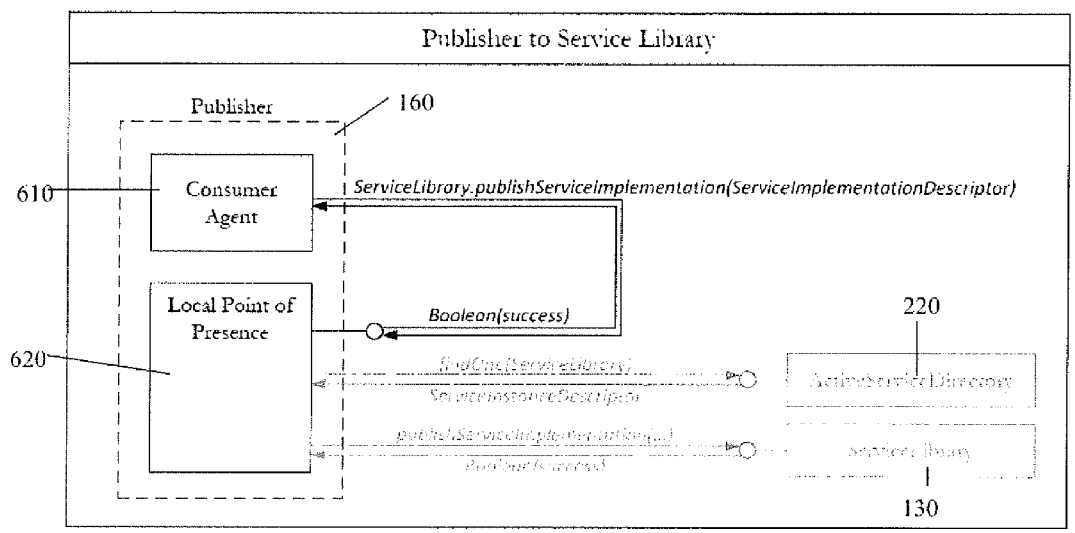
FIG. 6 is a schematic diagram of exemplary interactions between a Publisher and a Service Library in accordance with an embodiment of the disclosed subject matter.

In accordance with an embodiment of the disclosed subject matter, and with reference to FIG. 6, a Publisher 160 can be, though need not be, a service consumer who interacts with the Service Library 130 in order to publish and unpublish an implementation of a web service. As with other service consumers (e.g., 310), the Publisher 160 can include a consumer agent 610 and point of presence 620, and need not directly interact with any external web services, instead invoking the desired operations via the local point of presence 620.

For example, in order to publish an implementation of a web service (described, for example, with a ServiceImplementationDescriptor), Publishers 160 can bind to the local point of presence 610 and invoke the "publishServiceImplementation" operation of the Service Library 130 with the desired ServiceImplementationDescriptor. Once an implementation has been published it can become immediately available for use, able to be deployed onto capable Service Hosts as necessary to meet demand.

Figure 7:
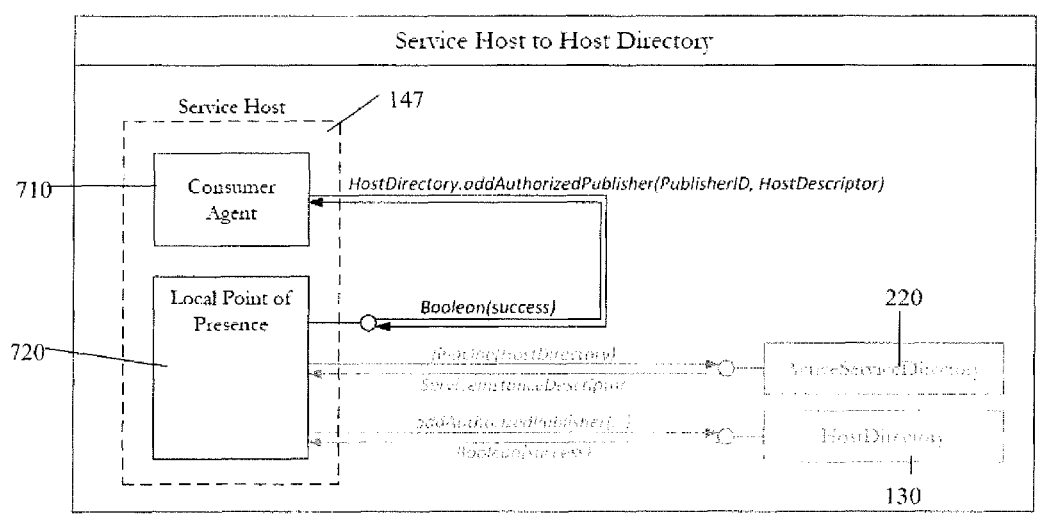
FIG. 7 is a schematic diagram of exemplary interactions between a Service Host and a Host Directory in accordance with an embodiment of the disclosed subject matter.

In accordance with an embodiment of the disclosed subject matter, and with reference to FIG. 7, a Service Host 147 can both, though need not, contribute to the role of service provider and also act as service consumers. As with other service consumers (e.g., 310), the Service Host 147 can include a consumer agent 710 and a local point of presence 720. The Service Host 147 can register itself with the Host Directory 130 by, for example, describing themselves using a HostDescriptor, bind to the local point of presence 720, and invoke the "addAuthorizedPublisher" operation of the host director 130. By operating through the local point of presence 720 the Service Host 147 registration process can thus be performed with the same invocation procedures provided by the infrastructure to all Service Consumers. Upon registration, a Service Host's HostDescriptor can be added to a shared pool of hosting resources, ready to be consumed as necessary to meet demand.

Figure 8:
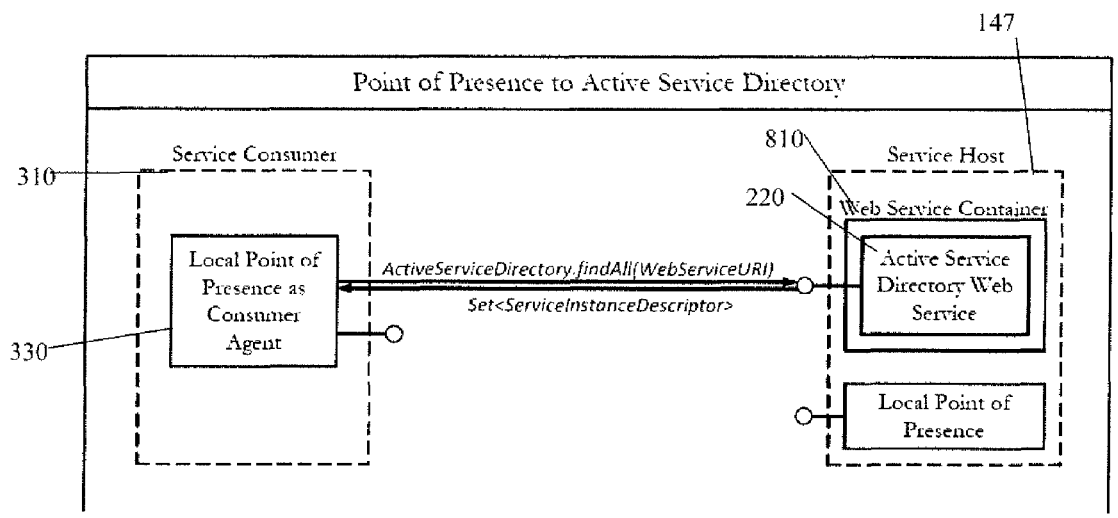
FIG. 8 is a schematic diagram of exemplary interactions between a point of presence and an Active Service Directory in accordance with an embodiment of the disclosed subject matter.

In accordance with an embodiment of the disclosed subject matter, and with reference to FIG. 8, a point of presence 330 associated with any service consumer 310 can be a transparent endpoint resolution and failure recovery mechanism which can locate, bind to, and invoke operations upon web services on behalf of the service consumer 310. For example, in order to locate an active instance of a web service the point of presence can interact with a web service called the "Active Service Directory" 810, invoking either its "findOne" or "findAll" operations with the URI of the desired web service as a parameter.

In order to participate in an instantiation of the architecture, the local point of presence can have prior knowledge of at least one Active Service Directory endpoint 810. Any alternative Active Service Directory endpoints can be listed in the Active Service Directory 220 under the web service URI "Active Service Directory" and can be located using the "findOne" and "findAll" operations. The POP can periodically retrieve and store a list of alternative Active Service Directory endpoints to use in the event of failure.

Figure 9:
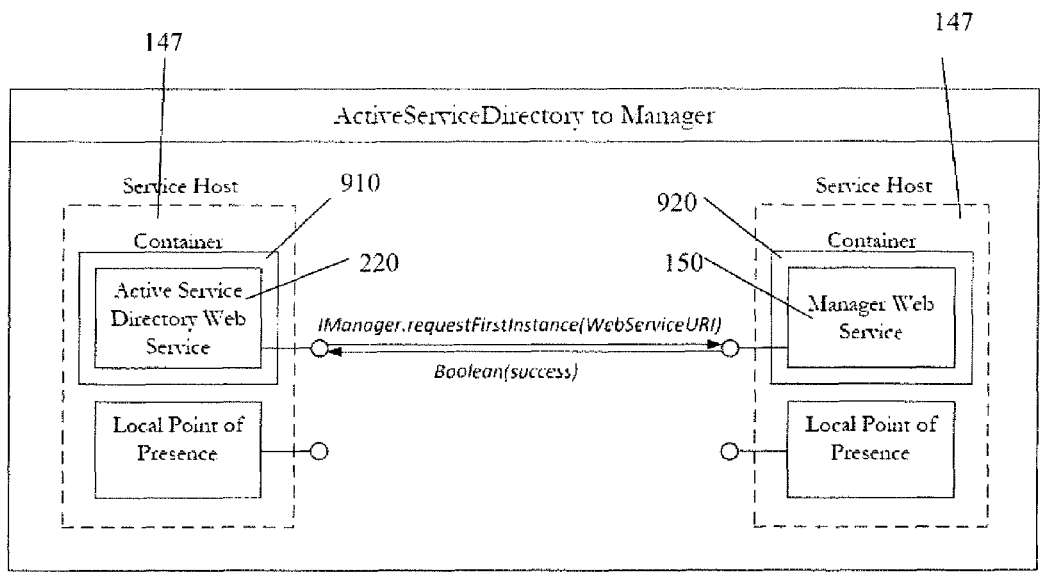
FIG. 9 is a schematic diagram of exemplary interactions between an Active Service Directory and a Manager in accordance with an embodiment of the disclosed subject matter.

In accordance with an embodiment of the disclosed subject matter, and with reference to FIG. 9, when the Active Service Directory 220 receives a lookup request for a web service with zero active endpoints, it can locate an instance of that web service's Manager 150 so that an endpoint may be deployed. The Active Service Directory 220 can utilize its own lookup facilities by binding to its local point of presence and invoking the Active Service Directory "findOne" or "findAll" operation using the URI of the Managing entity 920 responsible for the originally requested web service. This URI can be constructed, for example, by concatenating "Manager" URI to the URI of the requested web service in the pattern "WebServiceURI_ManagerURI." The Active Service Directory can be returned a ServiceInstanceDescriptor describing a web service endpoint which implements the "Manager" interface.

As a Manager 150 can be responsible for maintaining the directory records of the web service they manage, Managers 150 can insert a record of any endpoint they deploy into the Active Service Directory 220. Managers 150 can perform this operation in-band with, for example, the "requestFirstInstance" invocation—returning "true" if the entire deployment and registration process completed successfully, or "false" otherwise. The "requestFirstInstance" operation returning "false" can indicate that, given the current state of the system, it is not possible to deploy a new instance of the web service. This situation can represent an unrecoverable error which can be returned to the requesting entity (i.e., the Service Consumer). If the operation returns "true" the Active Service Directory 220 can re-perform the originally requested lookup operation and return the newly-inserted ServiceInstanceDescriptor to the requesting entity.

In accordance with an embodiment of the disclosed subject matter, and with reference to FIG. 10, the Manager 150 can communicate with various components, including the Service Library 130, Host Directory 120, one or more Service Hosts 147, and the Active Service Directory 220, in accordance with the exemplary and non-limiting description that follows. For example, with reference to FIG. 10a, Managers 150 can invoke the operations of the Service Library 130 in order to retrieve a set of implementations of the web service being deployed. These implementations can each be described with a ServiceImplementationDescriptor;

the elements of this descriptor can be used later by the Manager 150 in order to select a suitable candidate implementation for deployment.

Figure 10A:
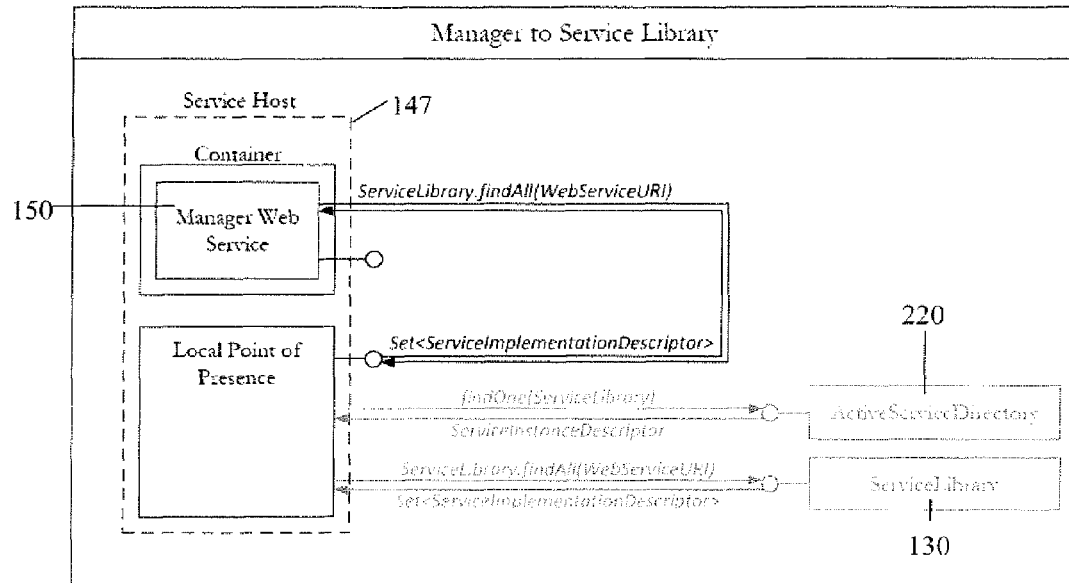
FIG. 10a is a schematic diagram of exemplary interactions between a Manager and a Service Library in accordance with an embodiment of the disclosed subject matter.
Figure 10B:
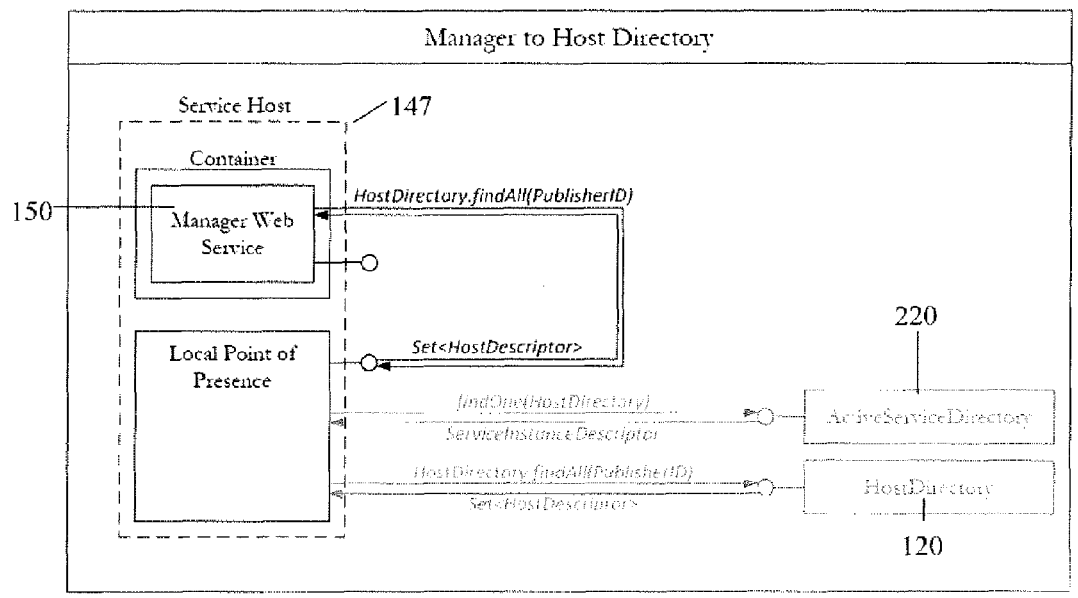
FIG. 10b is a schematic diagram of exemplary interactions between a Manager and a Host Directory in accordance with an embodiment of the disclosed subject matter.

In like manner, with reference to FIG. 10b, Managers 150 can invoke the operations of the Host Directory 120 during the deployment process. Managers 150 can use the Host Directory 120 to retrieve a set of HostDescriptors identifying Service Hosts 147 willing to deploy web service implementations published by the indicated Publisher 160 (identified, for example, with a unique PublisherID). Managers 150 can compare the ServiceImplementationDescriptors retrieved from the Service Library 130 with the HostDescriptors retrieved from the Host Directory 120 in order to craft suitable candidate deployment plans based on local policy. Once a plan is selected the Manager 150 can contact the selected Service Host 147 and initiate the deployment process.

Figure 10C:
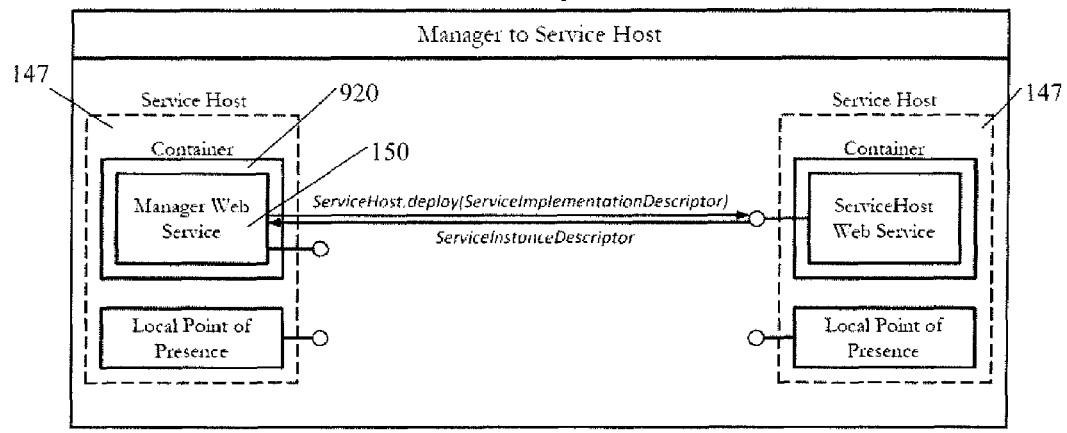
FIG. 10c and FIG. 10d are schematic diagrams of exemplary interactions between a Manager and a Service Host in accordance with an embodiment of the disclosed subject matter.

With reference to FIG. 10c, after selecting a suitable web service implementation (described with a ServiceImplementationDescriptor) for deployment on a selected Service Host 147 (described with a HostDescriptor) a Manager 150 can bind to the Service Host 147 included in the HostDescriptor and can invoke the "deploy" operation directly. Upon successful deployment the Service Host 147 can return the Manager 150 a ServiceInstanceDescriptor describing the newly deployed web service endpoint. The Manager 150 can then register this ServiceInstanceDescriptor in the Active Service Directory 220, completing the deployment process.

Figure 10D:
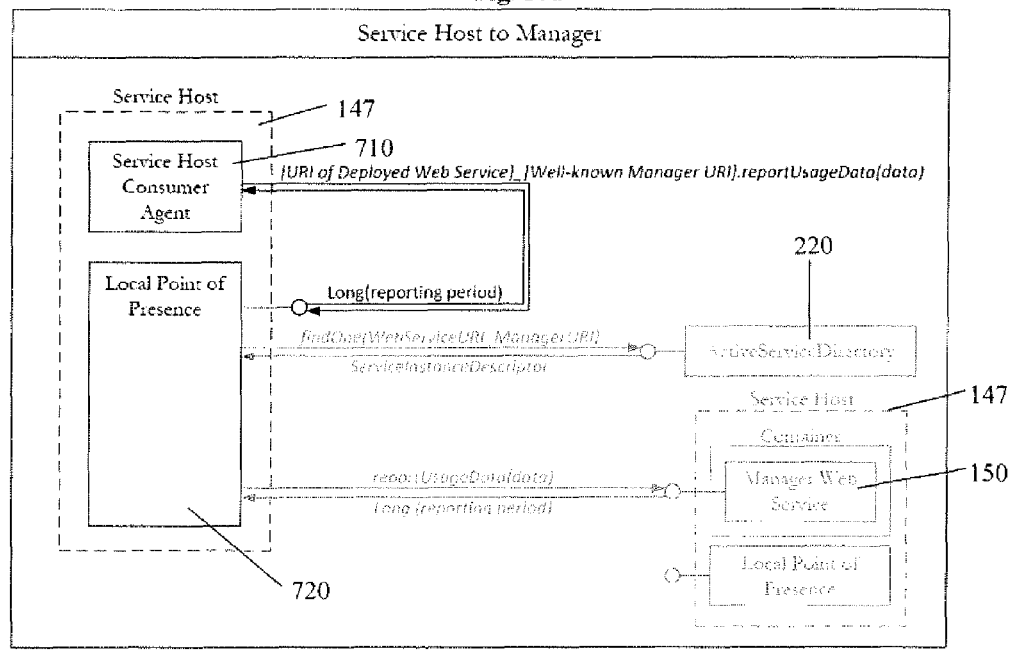

Conversely, with reference to FIG. 10d, for each web service endpoint deployed within their domain (e.g., the containers under their control), a Service Host 147 can report usage data to that web service's managing entity. The Service Host 147 can bind to the local point of presence 720 and can invoke the "reportUsageData" operation of the web service identified by the concatenation of a "Manager" URI to the URI of the web service for which data is being reported (e.g., "WebServiceURI_ManagerURI"). The "reportUsageData" operation can return a numerical value indicating the length of time the Service Host 147 should wait before next reporting usage data for this particular web service. A Service Host's 147 local policy can dictate that usage data be returned earlier than requested (e.g., due to local resource constraints, such as working memory); returning data significantly later than the requested period can indicate to the Manager 150 that there is a problem with the Service Host 147—information which a Manager 150 can act upon in order to effectively manage the availability of its service.

Figure 10E:
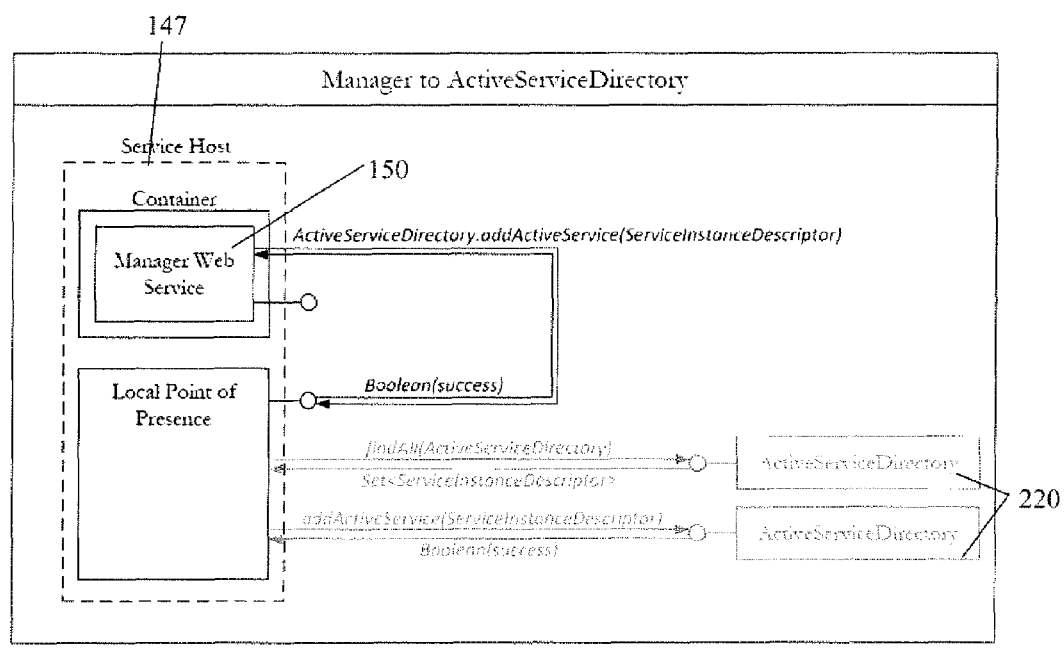
FIG. 10e is a schematic diagram of exemplary interactions between a Manager and an Active Service Directory in accordance with an embodiment of the disclosed subject matter.

With reference to FIG. 10e, when a Manager 150 of a web service successfully deploys or undeploys endpoints of that web service it can add or remove the endpoint reference in the Active Service Directory 220. Managers 150 can bind to the local point of presence and invoke the "addActiveService" or "removeActiveService" operation of the Active Service Directory 220 web service using the relevant ServiceInstanceDescriptor.

For example, Managers 150 can be responsible for maintaining the Active Service Directory entries of the web service they manage. Of all entities fulfilling the responsibilities of the Service Provider, Managers 150 can be deemed to be most interested in maintaining an accurate public record of the web service they each manage as it provides them with accurate usage data from which they may make more informed decisions in the fulfillment of their responsibility to manage the provisioning level of a web service.

Example

The present application is further described by means of an example, presented below. The use of such example is illustrative only and in no way limits the scope and meaning of the invention or of any exemplified term. Likewise, this application is not limited to any particular preferred embodiments described herein. Indeed, many modifications and variations of the invention will be apparent to those skilled in the art upon reading this specification. The invention is to be understood by the terms of the appended claims along with the full scope of equivalents to which the claims are entitled.

Figure 11:
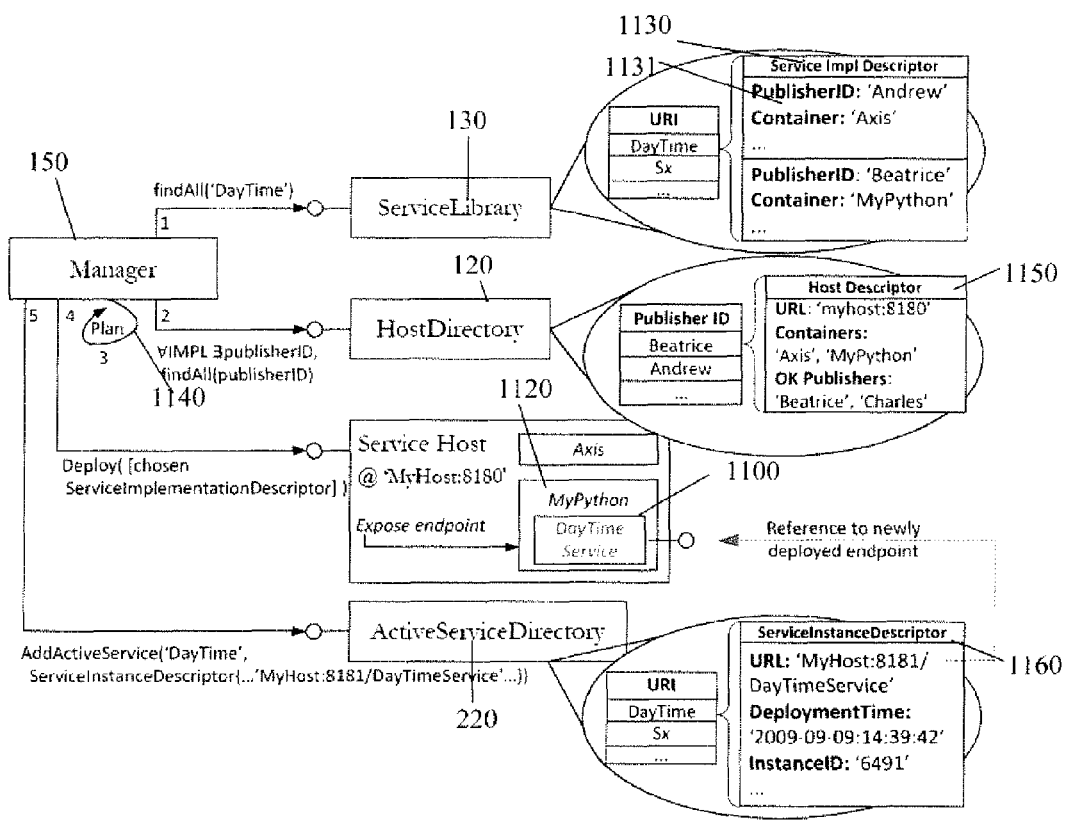
FIG. 11 is a schematic diagram of endpoint deployment in accordance with an embodiment of the disclosed subject matter.
Figure 12:
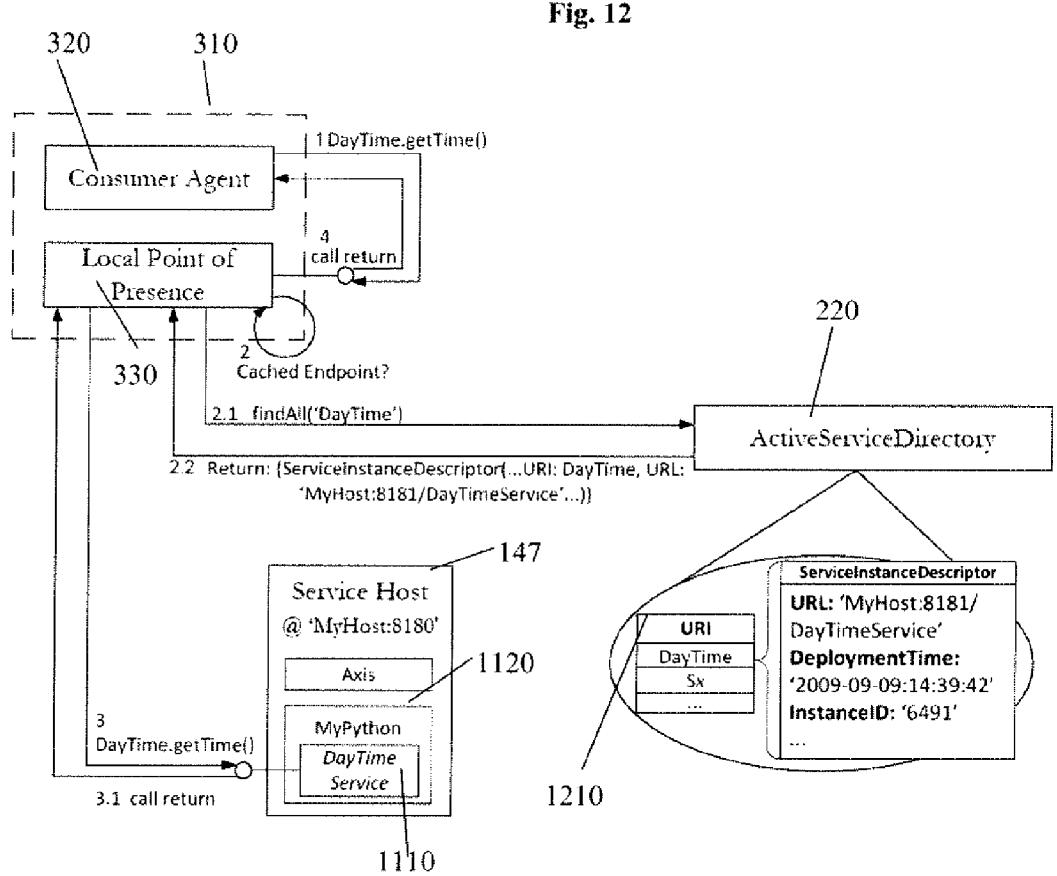
FIG. 12 is a schematic diagram of service invocation in accordance with an embodiment of the disclosed subject matter.
Figure 13:
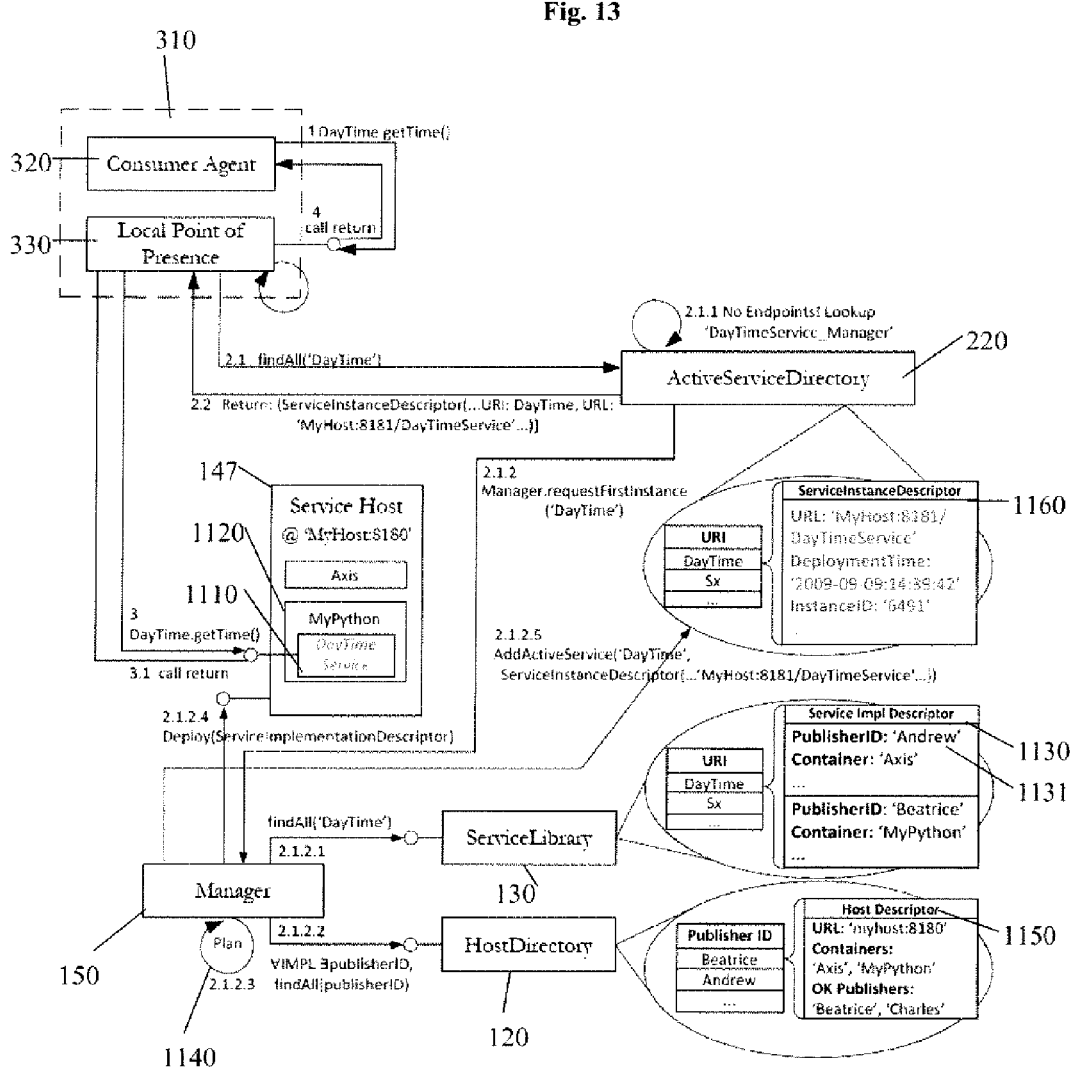
FIG. 13 is a schematic diagram of demand-driven dynamic deployment in accordance with an embodiment of the disclosed subject matter.

In this example, and with reference to FIG. 11, FIG. 12, and FIG. 13, procedures are described using the previously described exemplary component interactions as single steps for endpoint deployment, service invocation, and demand-driven dynamic deployment for the provision and invocation of a web service referred to as "DayTime."

The deployment of a new web service endpoint can be carried out by a Manager 150 as in FIG. 11. The Manager 150 can interact with the Service Library 130, Host Directory 120, one or more Service Hosts 147, and the Active Service Directory 220 in order to make a new "DayTime" web service 1100 endpoint 1120 available for use.

For purposes of illustration and not limitation, in order to deploy a new web service endpoint a Manager 150 can first create and select a valid deployment plan (the deployment plan comprising, for example, a ServiceImplementationDescriptor whose "requirements" are matched by the "capabilities" described in a HostDescriptor). The Manager 150 can begin by contacting the Service Library 130 and retrieving the set of all published implementations of the "DayTime" web service. Each implementation returned can be described with a ServiceImplementationDescriptor 1130, each of which can have a "PublisherID" element 1131. For each implementation, the Manager 150 can contact the Host Directory 120 using the PublisherID 1131 and retrieve the set of Service Hosts willing to deploy provider agent applications written by the specified Publisher. The Manager 150 then can create a set of valid deployment plans 1140 and select one from amongst the candidates based on local policy. Next the Manager 150 can execute the deployment plan, contacting the Service Host 140 described by the selected HostDescriptor 1150 and invoking its "deploy" operation with the selected ServiceImplementationDescriptor 1130. Upon successful deployment, the target Service Host 147 can return the Manager 150 a ServiceInstanceDescriptor 1160 describing the endpoint 1120. The Manager 150 can complete deployment by inserting the ServiceInstanceDescriptor 1160 into the Active Service Directory 220. Once the newly deployed endpoint is listed in the Active Service Directory 220 it can be deemed to be deployed, ready to be located and its operations invoked by Service Consumers.

With reference to FIG. 12, service invocation by service consumers 310 can include binding and invoking web service operations on a local point of presence 330. Once an invocation request is received, the local point of presence 330 can be responsible for locating an active endpoint of the target web service and invoking the requested operation on behalf of the Service Consumer, for example the "getTime" operation of the "DayTime" web service 1110.

Upon receiving an invocation request from a consumer agent 320 application, the local point of presence 330 can first extract the desired web service URI 1210 from the incoming request. If the point of presence 330 implements an endpoint cache, it can first check locally for a previously retrieved list of endpoints. If no such entries exist, a new list can be retrieved using the Active Service Directory 220. Once a list of endpoints is retrieved, the point of presence can select one for use according to local selection policy. The point of presence 330 can then prepare the invocation request (including possible modifications to the message), bind to the selected web service endpoint 1120, and forward the invocation request. If the invocation fails for any reason the same procedure can be attempted for the remainder of the active endpoints and, if all endpoints prove unavailable, a generic error can be returned to the Service Consumer 310. If the invocation is successful, the resulting response can be first prepared (again, possibly involving modification to the message) before being returned to the Service Consumer 310 and concluding the invocation process.

With reference to FIG. 13, in a dynamic demand-driven system, endpoint deployment can occur in response to an existing or anticipated event including, for example, the invocation of an operation of a web service for which there are currently no active endpoints. In such a circumstance, the subject matter disclosed above with reference to FIG. 11 and FIG. 12 can be performed. For example, When the Active Service Directory 220 receives a request for all endpoints 1120 of the "DayTime" web service 1110, it can find that there are none currently deployed. In this manner, the Active Service Directory 220 can initiate (though not necessarily enact) the deployment of the first instance of the requested web service by contacting that web service's Manager 150 and invoking the "requestFirstInstance" operation. At this point the deployment process can be executed as described above; when the Manager 150 returns from the "requestFirstInstance" operation, the Active Service Directory 220 can re-perform the lookup and return either a reference to the newly deployed endpoint 1120, or an error indicating that, given the currently available resources in the infrastructure, it is not possible to fulfill the request at the given time.

As described herein, the Manager 150 for a web service need not be currently deployed in order for that web service to be deployable. If implemented as a web service, and with generic and/or custom, service-specific Manager implementations published in the Service Library 130, the same deployment mechanisms can be used to deploy and manage a web service's Manager as those Managers use to manage their particular web service. This recursive, collapsible model can enable an infrastructure to be "wound up" to provide enough web service endpoints to meet demand, and then "wound down" to a state of zero resource consumption when demand falls to zero.

As described above in connection with certain embodiments, certain components, e.g., 110, 210, and 310, can include a computer or computers, processor, network, mobile device, cluster, or other hardware to perform various functions. Moreover, certain elements of the disclosed subject matter can be embodied in computer readable code which can be stored on computer readable media and when executed cause a processor to perform certain functions. In these embodiments, the computer plays a significant role in permitting the system and method for providing and/or consuming web services to provide such services over a network, e.g., the internet. For example, the presence of the computer, processor, memory, storage, and networking hardware provides the ability to deploy, consume, and manage a web service environment and dynamically apply and reclaim resources based upon measured consumer demand.

Additionally, as described above in connection with certain embodiments, certain components can communicate with certain other components, for example via a network, e.g., the internet. To the extent not expressly stated above, the disclosed subject matter is intended to encompass both sides of each transaction, including transmitting and receiving. One of ordinary skill in the art will readily understand that with regard to the features described above, if one component transmits, sends, or otherwise makes available to another component, the other component will receive or acquire, whether expressly stated or not.

The presently disclosed subject matter is not to be limited in scope by the specific embodiments herein. Indeed, various modifications of the disclosed subject matter in addition to those described herein will become apparent to those skilled in the art from the foregoing description and the accompanying figures. Such modifications are intended to fall within the scope of the appended claims.

The invention claimed is:

1. A system for providing web services, comprising:
a service library configured to store one or more web services;
one or more service hosts connected to a network and adapted to receive and fulfill deployment requests for the web services stored in the service library, wherein fulfilling deployment requests includes instantiating one or more endpoints of one of the web services;
a host directory connected to the service hosts and configured to store data related to the one or more service hosts; and
a manager configured to query the host directory and the service library, generate a deployment plan, and transmit deployment requests to the one or more service hosts.

2. The system of claim 1, wherein the service library is further configured to receive the one or more web services from a publisher.

3. The system of claim 1, wherein the one or more service hosts are further configured to transmit information about usage of the web services to the manager.

4. The system of claim 1, wherein the one or more service hosts are further configured to send the data related to the one or more service hosts to the host directory, and wherein the data related to the one or more service hosts includes available resources.

5. The system of claim 1, further comprising a discovery service including a directory, configured to register and maintain entries of the endpoints of each service host.

6. The system of claim 5, wherein the directory service is further configured to store a mapping between the web services and a corresponding set of the endpoints on which the web services are deployed.

7. The system of claim 6, wherein the directory service is further configured to receive a URI corresponding to one of the web services, request and resolve URL corresponding to one of the endpoints on which the one of the web services is deployed.

8. The system of claim 7, further comprising a service consumer including: a consumer agent; and a point of presence, to which the consumer agent is bound, the point of presence configured to communicate with the discovery service and configured to bind to the one or more service endpoints.

9. The system of claim 8, wherein the point of presence is configured to abstract over a location of a service while preserving the consumer agent's view, thereby acting as a gateway for the consumer agent into an instantiation of the web services.

10. A method for providing web services, comprising:
storing one or more web services in a service library;
storing data related to one or more service hosts in a host directory;
controlling, with a manager, deployment of the one or more web services on one or more service endpoints on each of the one or more service hosts, wherein controlling deployment includes:
querying the service library and host directory to retrieve information about the one or more web services and the data related to the one or more service hosts;
generating a deployment plan using the information about the one or more web services and the data related to the one or more service hosts;
transmitting deployment requests to the one or more service hosts; and
instantiating the one or more endpoints of one of the web services in response to the deployment requests.

11. The method of claim 10, further comprising receiving, at the service library, the one or more web services from a publisher.

12. The method of claim 10, further comprising transmitting, from the one or more service hosts, information about usage of the web services to the manager.

13. The method of claim 10, further comprising sending, from the one or more service hosts, the data related to the one or more services hosts to the host directory, and wherein the data related to the one or more service hosts includes available resources.

14. The method of claim 10, further comprising registering and maintaining entries of the endpoints of each service host in a discovery service including a directory.

15. The method of claim 14, further comprising storing, with the discovery service, a mapping between the web services and a corresponding set of the endpoints on which the web services are deployed.

16. The method of claim 15, further comprising receiving, at the discovery service, a URI corresponding to one of the web services, and requesting and resolving a URL corresponding to one of the endpoints on which the one of the web services is deployed.

17. A method for consuming web services, comprising:
binding a consumer agent to a point of presence; communicating, via the point of presence, with a discovery service to resolve a URL corresponding to a service endpoint corresponding to a desired web service URI; and
binding the point of presence to the service endpoint; wherein the discovery service is configured to communicate with a manager, the manager configured to query a host directory and a service library, generate a deployment plan, and transmit deployment and undeployment requests to one or more service hosts, one of which is configured to instantiate the service endpoint.

18. The method of claim 17, wherein the point of presence is configured to abstract over a location of a service while preserving the consumer agent's view, thereby acting as a gateway for the consumer agent into an instantiation of the web services.

19. The method of claim 17, the host directory is configured to store data related to the one or more service hosts.

20. The method of claim 17, the service directory is configured to store at least the desired web service.

21. A non-transitory computer-readable medium containing computer-executable instructions that when executed cause one or more computer devices to perform a method of providing web services, the method comprising:
storing one or more web services in a service library;
storing data related to one or more service hosts in a host directory;
controlling, with a manager, deployment of the one or more web services on one or more service endpoints on each of the one or more service hosts, wherein controlling deployment includes:
querying the service library and host directory to retrieve information about the one or more web services and the data related to the one or more service hosts;
generating a deployment plan using the information about the one or more web services and the data related to the one or more service hosts;
transmitting deployment requests to the one or more service hosts; and
instantiating the one or more endpoints of one of the web services in response to the deployment requests.

22. The non-transitory computer readable medium of claim 21, further comprising receiving, at the service library, the one or more web services from a publisher.

23. The non-transitory computer readable medium of claim 21, further comprising transmitting, from the one or more service hosts, information about usage of the web services to the manager.

24. The non-transitory computer readable medium of claim 21, further comprising sending, from the one or more service hosts, the data related to the one or more services hosts to the host directory, and wherein the data related to the one or more service hosts includes available resources.

25. The non-transitory computer readable medium of claim 21, further comprising registering and maintaining entries of the endpoints of each service host in a discovery service including a directory.

26. The non-transitory computer readable medium of claim 25, further comprising storing, with the discovery service, a mapping between the web services and a corresponding set of the endpoints on which the web services are deployed.

27. The non-transitory computer readable medium of claim 26, further comprising receiving, at the discovery service, a URI corresponding to one of the web services, and requesting and resolving a URL corresponding to one of the endpoints on which the one of the web services is deployed.

28. A non-transitory computer-readable medium containing computer-executable instructions that when executed cause one or more computer devices to perform a method for consuming web services, the method comprising:
binding a consumer agent to a point of presence; communicating, via the point of presence, with a discovery service to resolve a URL corresponding to a service endpoint corresponding to a desired web service URI; and
binding the point of presence to the service endpoint; wherein the discovery service is configured to communicate with a manager, the manager configured to query a host directory and a service library, generate a deployment plan, and transmit deployment and undeployment requests to one or more service hosts, one of which is configured to instantiate the service endpoint.

29. The non-transitory computer readable medium of claim 28, wherein the point of presence is configured to abstract over a location of a service while preserving the consumer agent's view, thereby acting as a gateway for the consumer agent into an instantiation of the web services.

30. The non-transitory computer readable medium of claim 28, the host directory is configured to store data related to the one or more service hosts.

31. The non-transitory computer readable medium of claim 28, the service directory is configured to store at least the desired web service.

32. A system for providing web services, comprising:
- a service library configured to store one or more web services, including a first web service;
- one or more service hosts connected to a network and adapted to receive and fulfill deployment requests for the web services stored in the service library, wherein fulfilling deployment requests includes instantiating one or more endpoints of one of the web services;
- a host directory connected to the service hosts and configured to store data related to the one or more service hosts; and
- a manager configured to receive an indication that the first web service is inactive and, responsive to the indication, query the host directory and the service library, generate a deployment plan for the first web service, and transmit deployment requests for the first web service to the one or more service hosts.

* * * * *